US012796763B2

(12) United States Patent
Cecchi et al.

(10) Patent No.: US 12,796,763 B2
(45) Date of Patent: Nov. 17, 2026

(54) LIGHTWEIGHT INTEGRATION OF SHOCK ABSORBING TECHNOLOGY IN A PROTECTIVE DEVICE

(71) Applicants: Savior Brain Inc., Arlington, VA (US); THE BOARD OF TRUSTEES OF THE LELAND STANFORD JUNIOR UNIVERSITY, Stanford, CA (US)

(72) Inventors: Nicholas James Cecchi, Anaheim, CA (US); Hossein Vahid Alizadeh, Mountain View, CA (US); David Benjamin Camarillo, Stanford, CA (US); Christoph Eduard Mack, Seattle, WA (US); Jeffrey Daniel Allison, Lake Oswego, OR (US); Gordon Lee Avery, Arlington, VA (US)

(73) Assignees: Savior Brain Inc., Arlington, VA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 371 days.

(21) Appl. No.: 18/378,922

(22) Filed: Oct. 11, 2023

(65) Prior Publication Data

US 2024/0148095 A1 May 9, 2024

Related U.S. Application Data

(60) Provisional application No. 63/379,000, filed on Oct. 11, 2022.

(51) Int. Cl.

| | |
|---|---|
| ***A42B 3/00*** | (2006.01) |
| ***A42B 3/06*** | (2006.01) |
| ***F16F 9/10*** | (2006.01) |

(52) U.S. Cl.
CPC .............. *A42B 3/065* (2013.01); *A42B 3/063* (2013.01); *A42B 3/064* (2013.01); *F16F 9/10* (2013.01)

(58) Field of Classification Search
CPC ......... A42B 3/065; A42B 3/063; A42B 3/064; F16F 9/10
See application file for complete search history.

(56) References Cited

U.S. PATENT DOCUMENTS

| | | | | |
|---|---|---|---|---|
| 1,171,722 A * | 2/1916 | Hough | B60G 15/04 | 267/3 |
| 3,151,856 A * | 10/1964 | Bresk | F16F 5/00 | 267/129 |
| 3,609,764 A * | 10/1971 | Morgan | A42B 3/122 | 2/414 |
| 3,994,020 A | 11/1976 | Villari | | |

(Continued)

FOREIGN PATENT DOCUMENTS

| | | | |
|---|---|---|---|
| EP | 1700625 A1 * | 9/2006 | B32B 3/30 |

*Primary Examiner* — Richale L Quinn
(74) *Attorney, Agent, or Firm* — Harness, Dickey & Pierce, P.L.C.

(57) ABSTRACT

Protective devices, such as, for example, helmets, have one or more efficient, fluid-containing shock absorbers in place of protective devices' original shock absorbing material to minimize the overall weight of the protective devices. The more efficient, fluid-containing shock absorbers yield improved impact force attenuation but occupy substantially less volume and, consequently, less weight, than the original shock absorbing material.

6 Claims, 9 Drawing Sheets

(56) References Cited

U.S. PATENT DOCUMENTS 3,999,220 A * 12/1976 Keltner .................. A42B 3/121 2/24
4,024,586 A * 5/1977 Lamb ....................... A42B 3/28 2/909
4,345,338 A * 8/1982 Frieder, Jr. ............. A42B 3/124 2/425
4,354,284 A 10/1982 Gooding
4,453,271 A 6/1984 Donzis
4,853,980 A * 8/1989 Zarotti ................... A42B 3/285 2/413
6,378,140 B1 * 4/2002 Abraham ............... A42B 3/064 2/463
6,401,260 B1 * 6/2002 Porth ..................... A42B 1/004 2/416
7,721,348 B2 * 5/2010 Nurnberg ............. A41D 31/285 2/2.5
7,774,866 B2 * 8/2010 Ferrara ..................... B32B 5/18 2/455
7,895,681 B2 * 3/2011 Ferrara ................. B32B 27/065 2/455
7,950,073 B2 5/2011 Ferrara
8,528,119 B2 9/2013 Ferrara
8,615,817 B2 12/2013 Phillips
8,739,317 B2 6/2014 Abernethy
8,814,150 B2 8/2014 Ferrara et al.
8,950,735 B2 2/2015 Reynolds et al.
8,955,169 B2 2/2015 Weber et al.
9,388,873 B1 * 7/2016 Phipps ................. A43B 13/181
9,439,469 B2 * 9/2016 Phipps ................... A42B 3/064
9,462,842 B2 10/2016 Hoshizaki et al.
9,468,249 B2 10/2016 Fraser et al.
9,545,125 B2 * 1/2017 Yoon .................... A41D 13/015
9,683,622 B2 6/2017 Ferrara
9,713,355 B2 7/2017 Daoust
9,820,525 B2 11/2017 Weber et al.
9,841,075 B2 12/2017 Russo
D814,708 S * 4/2018 Thorpe ........................ D29/122
10,143,256 B2 * 12/2018 Straus .................... A63B 71/10
10,219,573 B2 3/2019 Podboy
10,258,100 B1 * 4/2019 Erb ........................ A42B 3/128
10,271,602 B2 4/2019 Halldin et al.
10,271,604 B2 4/2019 Hallander
10,306,942 B2 6/2019 Hoshizaki et al.
10,369,452 B2 * 8/2019 Jimenez ................. A63B 71/10
10,561,192 B2 2/2020 Weber et al.
10,779,602 B2 9/2020 Tuttle et al.
10,980,306 B2 4/2021 Weber et al.
11,019,871 B2 6/2021 Sadegh et al.
11,109,632 B2 9/2021 Suddaby
11,109,633 B2 9/2021 Hoshizaki
11,234,475 B2 2/2022 Podboy
11,259,588 B2 * 3/2022 Young .................... A42B 3/064
11,324,272 B2 5/2022 Hoshizaki
11,517,062 B2 12/2022 Timlick
11,638,458 B2 * 5/2023 Durocher ............... A42B 3/127 2/414
11,839,254 B2 12/2023 Pomering
2006/0059606 A1 * 3/2006 Ferrara .................. A01N 25/18 2/412
2007/0190292 A1 * 8/2007 Ferrara .................. A42B 3/121 428/166
2007/0190293 A1 * 8/2007 Ferrara ................. B32B 27/065 428/166
2010/0000009 A1 * 1/2010 Morgan ................. A42B 3/128 2/414
2011/0047685 A1 * 3/2011 Ferrara .................. A42B 3/063 2/455
2012/0186003 A1 * 7/2012 Heger .................. A41D 13/015 188/267.2
2013/0125294 A1 * 5/2013 Ferrara .................. A42B 3/064 2/455
2014/0020158 A1 1/2014 Parsons et al.
2014/0201890 A1 * 7/2014 Kelly ..................... A42B 3/122 2/413
2016/0157545 A1 * 6/2016 Bowman ................ A42B 3/067 2/416
2016/0165993 A1 * 6/2016 Knight ................... A42B 3/124 2/455
2017/0105470 A1 * 4/2017 Eaton ..................... A42B 3/064
2018/0153243 A1 * 6/2018 Pradeep ................. A42B 3/064
2019/0328072 A1 * 10/2019 Hoshizaki .............. A42B 3/062
2019/0350295 A1 * 11/2019 Timlick ................. A42B 3/064
2020/0281299 A1 9/2020 Nichols
2020/0305534 A1 * 10/2020 Chilson ...................... B32B 3/04
2020/0375300 A1 * 12/2020 Green ........................ B32B 3/14
2021/0106091 A1 * 4/2021 Glover ................... A63B 71/08
2024/0049828 A1 * 2/2024 Allison .................. A42B 3/121
2024/0148095 A1 * 5/2024 Cecchi ................... A42B 3/063
2024/0277101 A1 * 8/2024 Wikner .................. A42B 3/003
2024/0341393 A1 * 10/2024 Colonna ................ A42B 3/121
2024/0410438 A1 * 12/2024 Cecchi .................... F16F 9/106
2025/0098808 A1 * 3/2025 Cecchi ................... A42B 3/121
2025/0374985 A1 * 12/2025 Pomering .............. A42B 3/062

* cited by examiner

LIGHTWEIGHT INTEGRATION OF SHOCK ABSORBING TECHNOLOGY IN A PROTECTIVE DEVICE

The present invention claims priority to U.S. Prov. Pat. App. No. 63/379,000, titled "Lightweight Integration of Shock Absorbing Technology in a Protective Device," filed Oct. 11, 2022, which is incorporated herein by reference in its entirety.

STATEMENT OF GOVERNMENT RIGHTS

This invention was made with government support under U.S. Government Contract No. NS119134 awarded by the National Institutes of Health. The U.S. Government has certain rights to this invention.

TECHNICAL FIELD

The present invention relates to protective devices, such as, for example, helmets, that utilize one or more efficient, fluid-containing shock absorbers in place of a protective device's existing shock absorbing material to minimize the overall weight of the protective device and provide additional ventilation for the same. The more efficient, fluid-containing shock absorbers yield improved impact force attenuation but occupy substantially less volume in the protective device than heretofore known shock absorbing material.

BACKGROUND

Protective equipment devices, particularly helmets, are commonly used in a variety of industries and activities, including sports, military, construction, law enforcement, vehicle applications, and more. Many protective gears and helmets seek to protect wearers by minimizing the force imposed on the wearer's body, head, and/or brain by impacts from external sources. However, this equipment must generally be developed within certain confines related to size, weight, field of view, etc. such that the wearer experiences a level of comfort that is acceptable and the wearer is not substantially restricted by the equipment in their activity. Therefore, the amount of material used to create these wearable protective devices is finite and restricted based on the type of activity the device will be used in. In some cases, the weight, size, or field of view allowed when wearing the equipment may be restricted by governing bodies that oversee standardized testing protocols and manufacturing requirements for protective equipment.

Recently, a number of technologies have been developed which seek to improve the efficiency of shock absorbers in helmets and other applications within a given amount of space. While these advances have generally improved the state-of-the-art in helmet technology, an issue still remains that these technologies can be relatively heavy when compared to older, less space-efficient technologies.

An optimal solution for decreasing helmet weight while maintaining efficient attenuation of impacts would be to use the minimum amount of shock absorbers needed to reach the target attenuation of a given impact, rather than filling the full volume of the helmet with shock absorbing material. The positioning of the shock absorbers and the means of making the devices fit comfortably within protective devices while also providing ample protection would require careful thought, such that certain areas of the head are not left unprotected or certain areas do not present the wearer's head with focalized pressure points.

A need, therefore, exists for improved protective devices. Specifically, a need exists for improved protective devices that utilize shock absorbers that minimize weight within the protective devices. In addition, a need exists for improved protective devices that utilize the minimum amount of shock absorbers and other structural material.

Moreover, a need exists for improved protective devices that provide positioning of the shock absorbers to provide necessary protection but also provide comfort to a user when wearing and/or using the protective devices. Specifically, a need exists for improved protective devices that provides protection so that a user's body parts, namely their heads, are not left unprotected. Moreover, a need exists for improved protective devices that do not present a wearer's body part with focalized pressure points that may be uncomfortable or cause damage or injury to the user.

SUMMARY OF THE INVENTION

The present invention relates to protective devices, such as, for example, helmets, that utilize one or more efficient, fluid-containing shock absorbers in place of a protective device's existing shock absorbing material to minimize the overall weight of the protective device and provide additional ventilation for the same. The more efficient, fluid-containing shock absorbers yield improved impact force attenuation but occupy substantially less volume in the protective device than heretofore known shock absorbing material.

To this end, in an embodiment of the present invention, a . . .

It is, therefore, an advantage and objective of the present invention to provide improved protective devices.

Specifically, it is an advantage and objective of the present invention to provide improved protective devices that utilize shock absorbers that minimize weight within the protective devices.

In addition, it is an advantage and objective of the present invention to provide improved protective devices that utilize the minimum amount of shock absorbers and other structural material.

Moreover, it is an advantage and objective of the present invention to provide improved protective devices that provide positioning of the shock absorbers to provide necessary protection but also provide comfort to a user when wearing and/or using the protective devices, such as via improved ventilation of the same.

Specifically, it is an advantage and objective of the present invention to provide improved protective devices that provides protection so that a user's body parts, namely their heads, are not left unprotected.

Moreover, it is an advantage and objective of the present invention to provide improved protective devices that do not present a wearer's body part with focalized pressure points that may be uncomfortable or cause damage or injury to the user.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to protective devices, such as, for example, helmets, that utilize one or more efficient, fluid-containing shock absorbers in place of a protective device's existing shock absorbing material to minimize the overall weight of the protective device and provide additional ventilation for the same. The more efficient, fluid-containing shock absorbers yield improved impact force attenuation but occupy substantially less volume in the protective device than heretofore known shock absorbing material.

Figure 1:
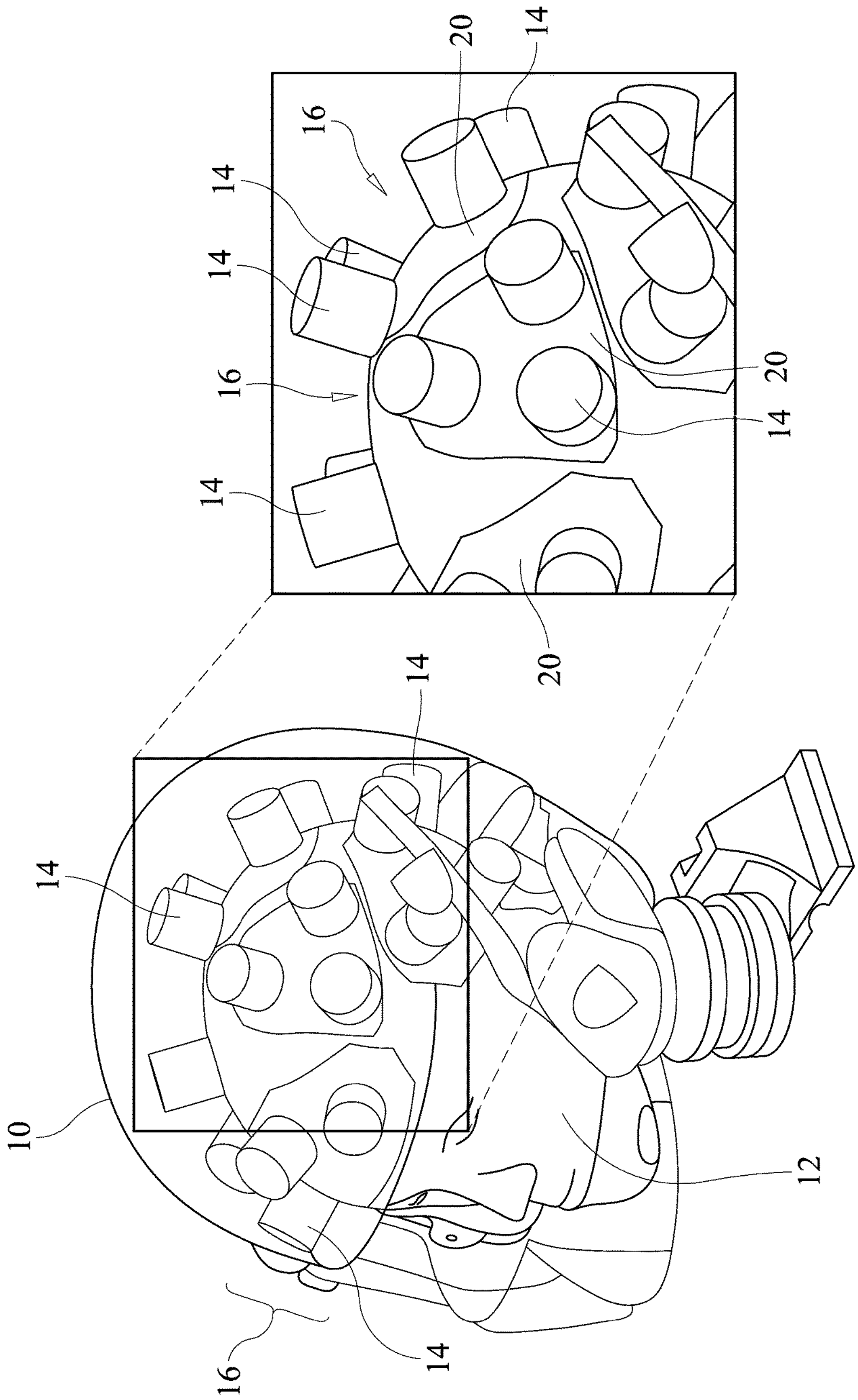
FIG. 1 illustrates a helmet covering a majority of the wearer's head, featuring shock absorbers arranged in a manner such that they are grouped together in similar groups of three, in an embodiment of the present invention.

FIG. 1 illustrates a protective device, namely a helmet 10 that may cover a portion or a majority of the wearer's head 12, featuring shock absorbers 14 arranged in a manner such that they may be grouped together in similar groups 16 of three. Each group 16 of three shock absorbers 14 may be disposed between an outer shell 18 of the helmet 10 and an inner surface or inner panel 20, wherein the inner surfaces 20 may preferably contact the user's head 12. There may be, preferably, a single outer shell, while there are preferably a plurality of inner surfaces. The groups 16 of shock absorbers 14 may be spread out such that no inner surface 20 may touch another inner surface 20 while at rest, and no shock absorber 15 may touch another shock absorber 14.

Figure 2:
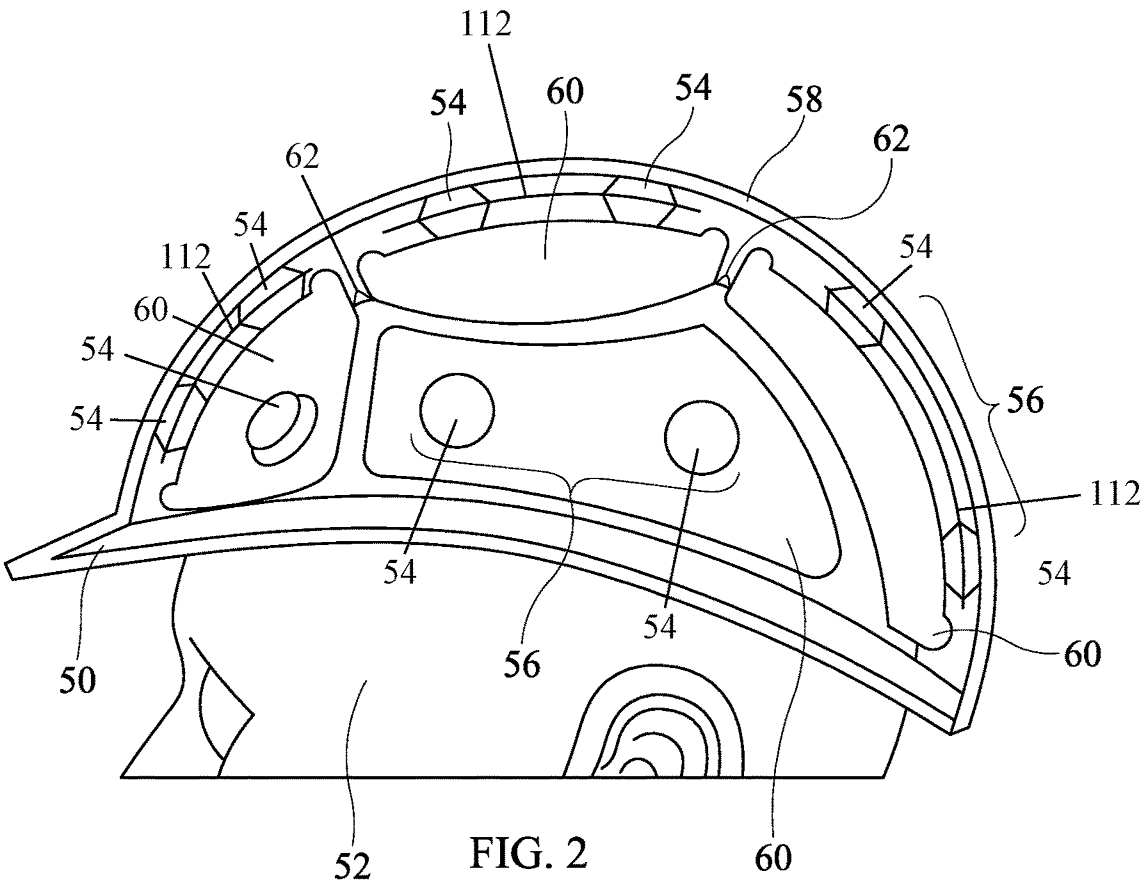
FIG. 2 illustrates a helmet covering a significant portion of the wearer's head above the ear, featuring shock absorbers arranged in a manner such that they are grouped together in groups of varying number, but more than one, in an embodiment of the present invention.

FIG. 2 illustrates a protective device, namely a helmet 50 covering a significant portion of a wearer's head 52 above his or her ears, featuring a plurality of shock absorbers 54 arranged in a manner such that they may be grouped together in groups 56 of varying number, such as two, three, four, or more, but more than one. Each group 56 of shock absorbers 54 may be disposed between an outer shell 58 of the helmet 50 and an inner surface or inner panel 60 of varying shapes and sizes, wherein the inner surfaces 60 may preferably contact the user's head 52. There may be a single outer shell 58, while there are a plurality of inner surfaces 60. The groups 56 of shock absorbers 54 may be spread out such that no inner surface 60 touches another inner surface 60 at rest, and no shock absorber 54 touches another shock absorber 54. In some cases, the shock absorbers may be connected to one another, such as illustrated in FIG. 2 via an inter-surface connection 62, while in other cases they may stand alone without connection between surfaces 60. The inter-surface connection 62 may be an elastic or tensile component that may be used to connect inner surfaces to one another, such that when the inner surfaces translate away from each other, the elastic or tensile component will tighten and/or return the inner surfaces to their original positions.

Figure 3:
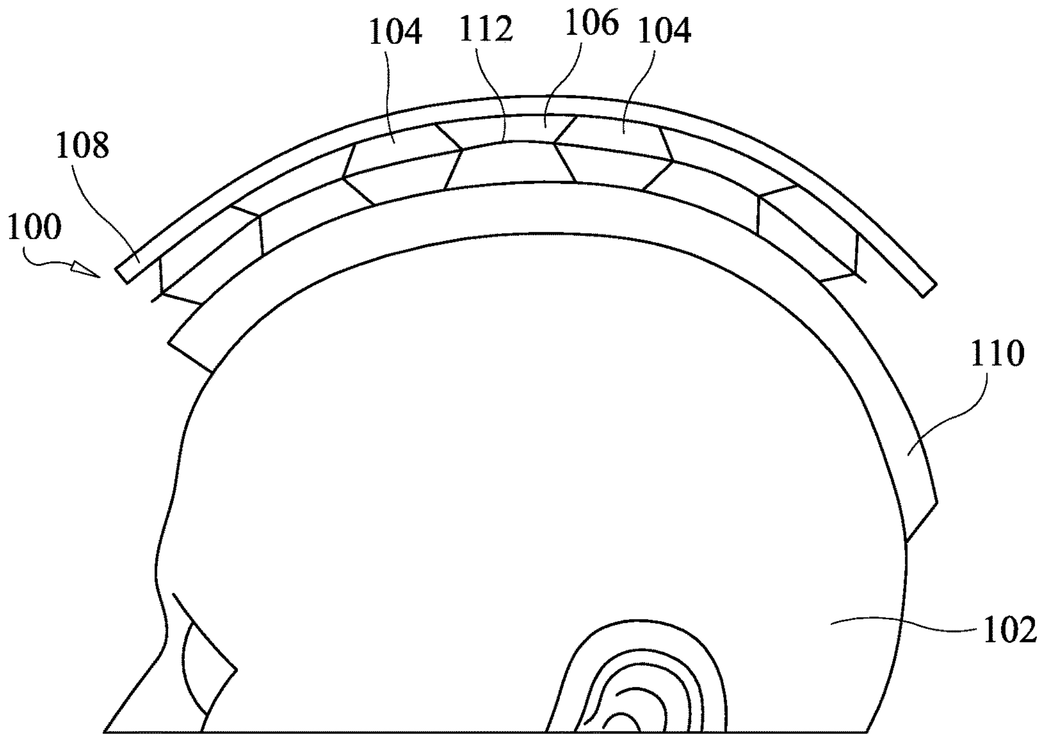
FIG. 3 illustrates groups of shock absorbers that are disposed between the outer shell of a helmet and an inner surface that contacts the wearer's head, in an embodiment of the present invention.

FIG. 3 illustrates a helmet 100 that may be worn or disposed on a user's head 102 comprising a group 106 of shock absorbers 104 that may be disposed between an outer shell 108 of the helmet 100 and an inner surface or inner panel 110 that contacts the wearer's head 102. Both the outer shell 108 and the inner surface 110 may be made of a continuous material, where there is a single outer shell 108 and a single inner surface 110, with the plurality of shock absorbers 104 disposed therebetween. The inner surface may be made from a thicker material, such as a thick foam, or other like material providing additional shock absorbing properties. Optionally, each of the shock absorbers may be connected to each other via a material 112. The material may also form passages or tunnels connecting one shock absorber to at least one other shock absorber, allowing fluid to flow through from one shock absorber to another shock absorber, especially when compressed due to an impact.

Figure 4:
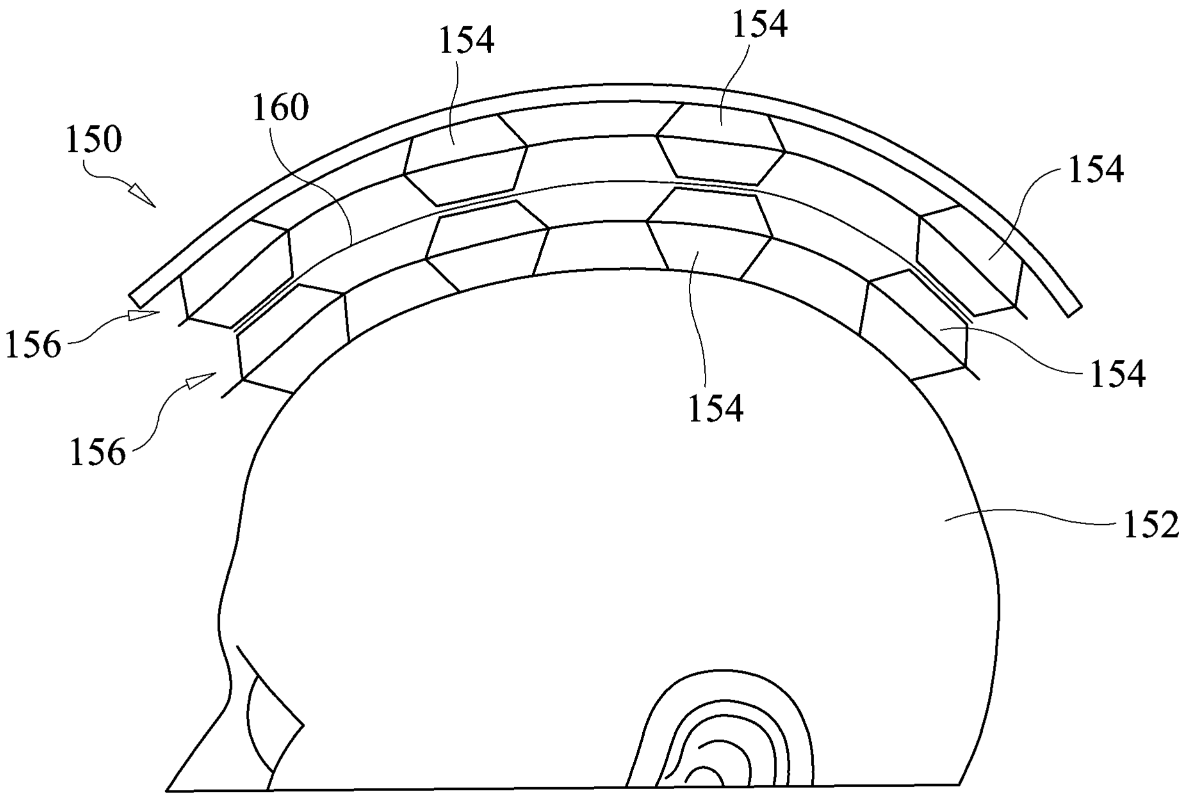
FIG. 4 illustrates groups of shock absorbers that are disposed between the outer shell of a helmet and an inner surface that contacts the wearer's head, in an embodiment of the present invention.

FIG. 4 illustrates a helmet 150 for a user's head 152 comprising groups 156 of shock absorbers 154 that may be disposed between an outer shell 158 of the helmet 150 and an inner surface or inner panel 160 that may contact the wearer's head 152. Both the outer shell 158 and the inner surface 160 may be made of a continuous material, where there is only one single outer shell 158 and one inner surface 160. The inner surface 160 and outer shell 158 may be made of the same or a similar material, or the inner surface may be made of a different material. The inner surface 160 may contact a second group 156 of shock absorbers 154 (or, in an alternate embodiment, a separate shock absorbing material, such as a foam or the like) which may directly contact the wearer's head 152.

Figure 5A:
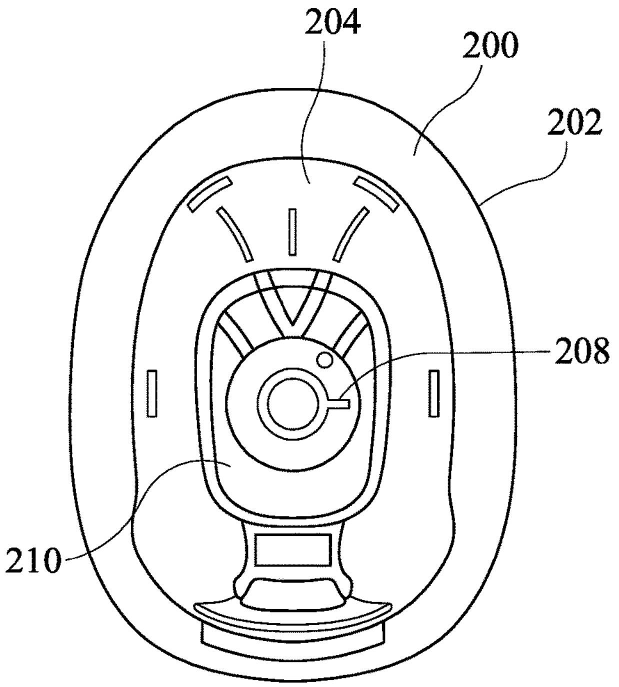
FIGS. 5A-5C illustrate an inside view of a helmet constructed from an exterior shell and an interior rigid foam directly connected to the shell having a single shock absorber disposed therein, in an embodiment of the present invention.
Figure 5B:
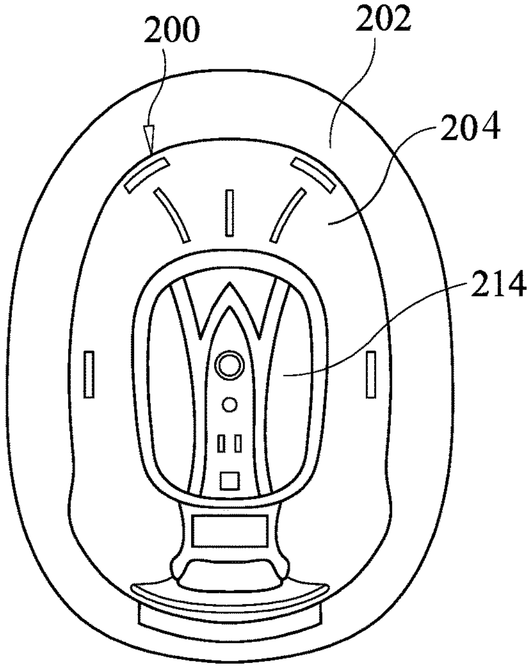
Figure 5C:
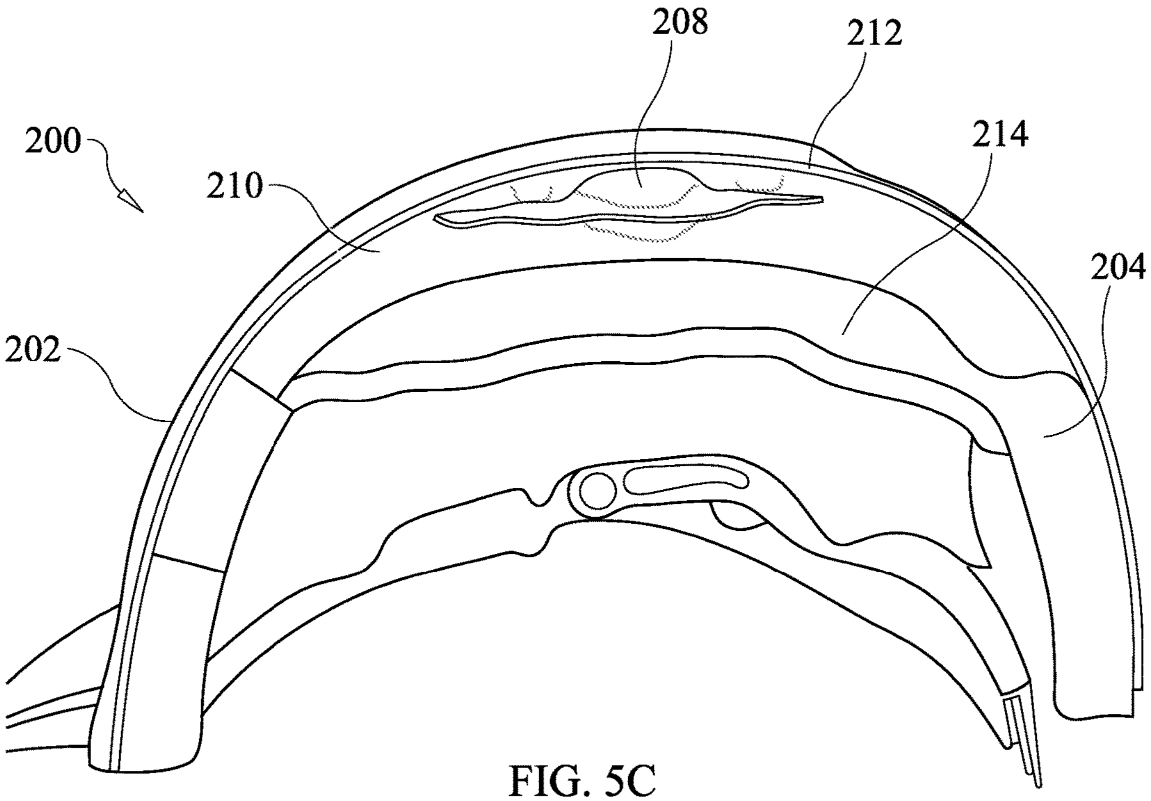

FIGS. 5A-5C illustrate an inside view of a helmet 200 constructed from an exterior shell 202 and an interior rigid foam 204 that may be directly connected to the shell 202. A section (not shown) of the interior rigid foam 204 may be removable to make space for a single shock absorber 208 placed centrally in an empty space 210 formed from the removed section of the interior rigid foam 204. The single shock absorber 208 may be placed so as to directly contact an interior surface 212 of the outer shell 202, as illustrated in FIG. 5A. A plate 214 of a material, such as a rigid foam, for example, may be placed over the shock absorber 208, as illustrated in FIGS. 5B and 5C. Together, the plate 214 of rigid foam and the inner surface of the remainder of the interior rigid foam 204 may thus form an inner surface or inner panel 216 that may directly contact a wearer's head (not shown). FIG. 5C illustrates a cross-sectional view of the helmet 200 showing the exterior shell 202, the interior rigid foam 204, the plate 214 of rigid foam material, and the single shock absorber 208 placed centrally in the empty space 210.

Figure 6:
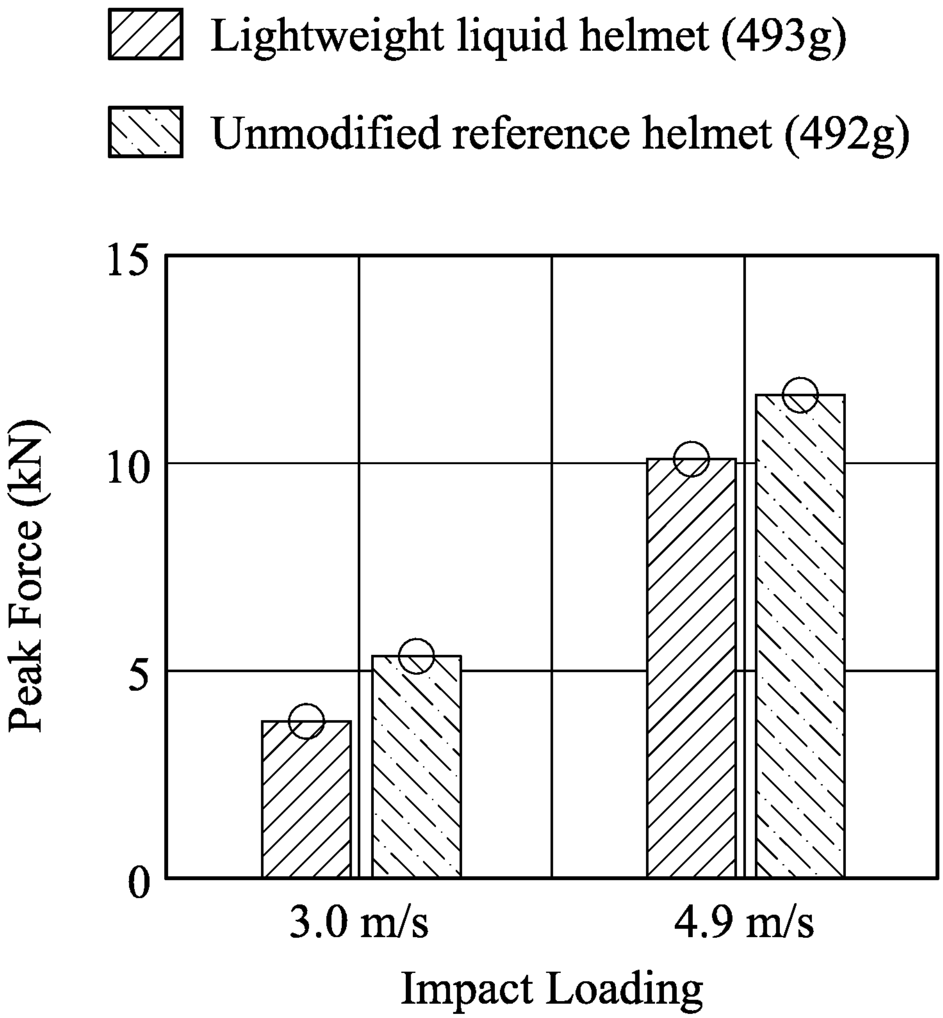
FIG. 6 illustrates peak force data from impact experiments in which helmets are worn by a test head-form and dropped onto a force plate, in an embodiment of the present invention.

FIG. 6 illustrates peak force data from impact experiments in which helmets are worn by a test head-form and dropped onto a force plate. An unmodified, standard equestrian helmet made from continuous expanded polystyrene foam was compared to a lightweight liquid shock absorber helmet made by cutting out a large section of the foam and replacing it with a small liquid shock absorber (as described above with reference to FIGS. 5A-5C). Both helmets are nearly identical in mass. The "lightweight liquid helmet" (i.e., the helmet having the shock absorber therein) may make better use of its mass by lowering the peak force (in kN) of the impact relative to the standard, unmodified helmet. Two impact velocities were tested, one at 3.0 m/s and the other at 4.9 m/s.

Figure 7:
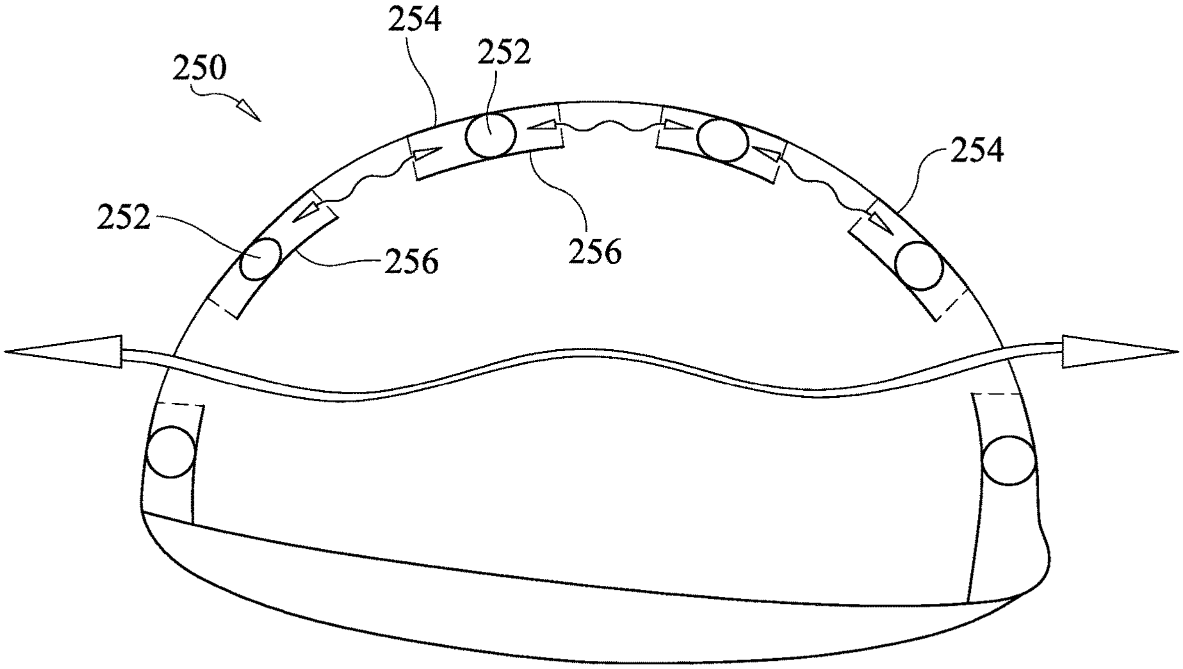
FIG. 7 illustrates a cross sectional view of a helmet demonstrating an advantage in improved ventilation by utilizing the lightweight integration of shock absorbers in a helmet, in an embodiment of the present invention.

FIG. 7 illustrates a cross-sectional view of a helmet 250 demonstrating an advantage in improved ventilation by utilizing the lightweight integration of shock absorbers 252 in the helmet 250. Specifically, the use of a limited number of shock absorbers 252 may allow for more open space in the helmet, which may in turn allow for improved ventilation both through the helmet 250 and within the helmet 250 (i.e., between an outer shell 254 and a plurality of inner surfaces or inner panels 256 that may contact the wearer's head). The inner surfaces 256 may be attached to the outer shell 254 or outer surface of the helmet by means of elastic or tensile components that may allow for compression of the inner surfaces 256 towards the outer shell 254 but may restrict movement of the inner surfaces 256 and shock absorbers 252 within a desired range.

Figure 8:
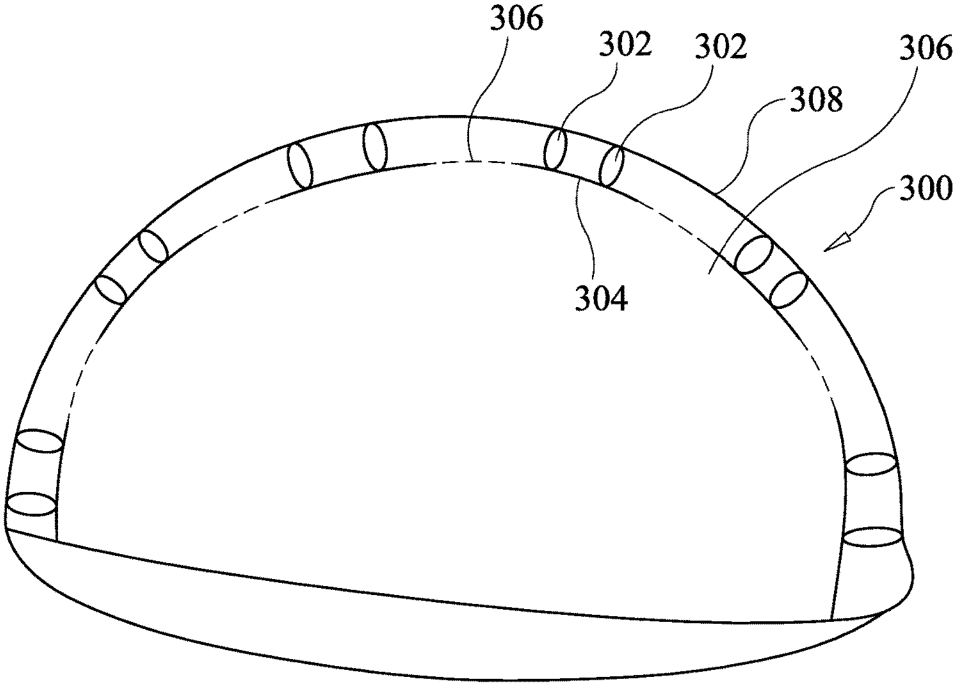
FIG. 8 illustrates a cross sectional view of a helmet demonstrating a connection between inner surfaces, in an embodiment of the present invention.

FIG. 8 illustrates a cross-sectional view of a helmet 300 demonstrating a plurality of shock absorbers 302, each having an inner surface or inner panel 304, where there may be a connection 306 between respective inner surfaces 304. The shock absorbers 302 may be disposed between a plurality of inner surfaces 304, respectively and an outer shell 308 of the helmet 300. The inner surfaces 304 may be attached to one another with, for example, relatively thin elastic or tensile components that may restrict the movement of the inner surfaces 304 relative to one another. Alternatively, the inner surfaces 304 may be connected to one another with one or more rigid connections 306 that may be designed to break at a predetermined force.

Figure 9:
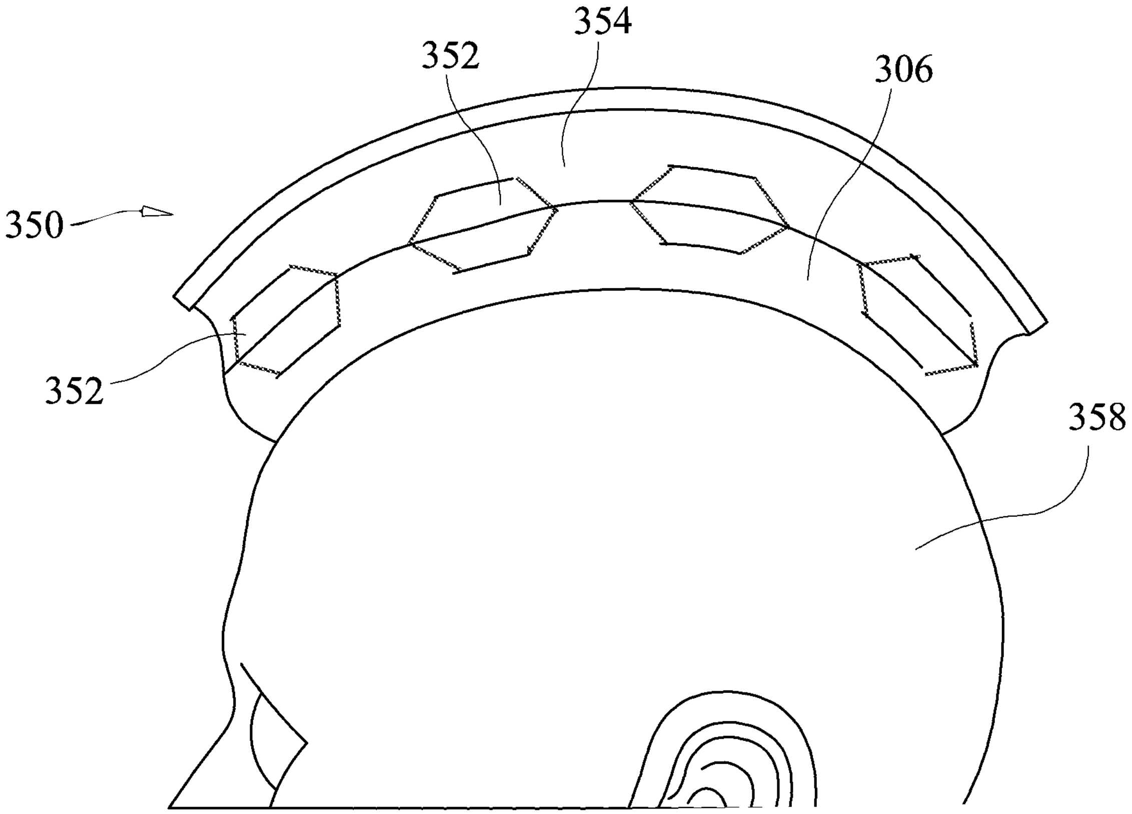
FIG. 9 illustrates a cross sectional view of a helmet in which shock absorbers are embedded within a top and bottom layer of foam, in an embodiment of the present invention.

FIG. 9 illustrates a cross sectional view of a helmet 350 in which a plurality of shock absorbers 352 are embedded within a top and bottom layer of foam 354, 356, respectively. These layers of foam 354, 356 may serve to hold the shock absorbers 352 in a desired location within the helmet 350, may provide additional impact protection, and/or may further provide the user with more optimal helmet 300 comfort and fit on his or her head 358.

Figure 10A:
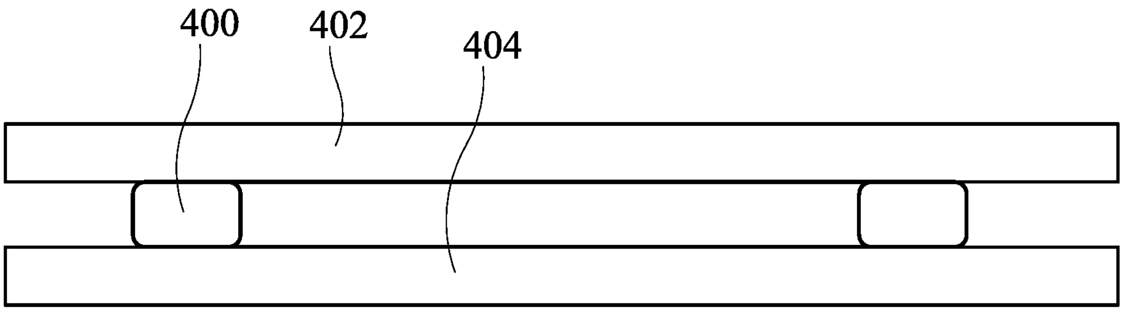
FIGS. 10A-10C illustrate close up views of shock absorbers placed between two surfaces for use in a helmet or other protective device, in an embodiment of the present invention.
Figure 10B:
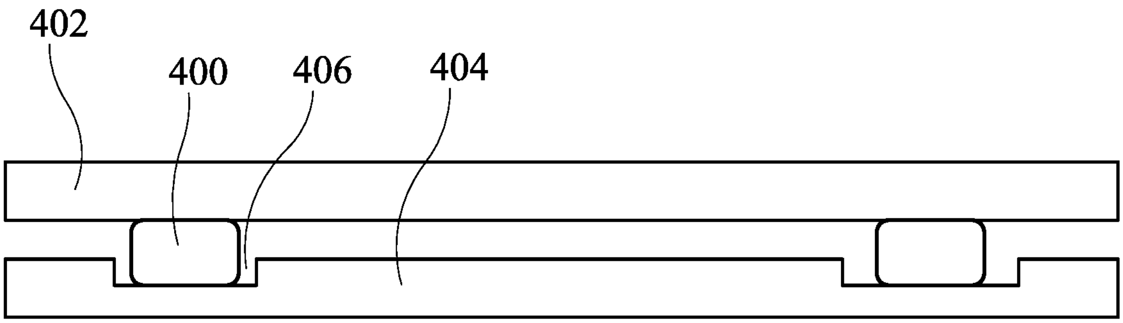
Figure 10C:
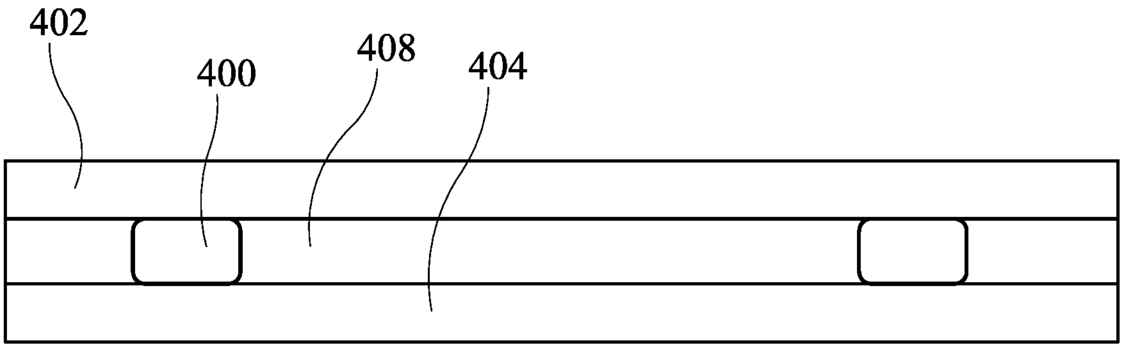

FIGS. 10A-10C illustrate close up views of shock absorbers 400 placed between two surfaces, an outer surface or outer panel 402 and an inner surface or inner panel 404, for use in a helmet or other protective device (not shown). The shock absorbers 400 may make contact with a relatively low amount of surface area of the surfaces 402, 404. FIG. 10A illustrates an embodiment wherein both surfaces 402, 404 that may contact the shock absorber 400 are flat. The shock absorber 400 may be adhered to one or more of the surfaces 402, 404 with a glue, adhesive, hook and loop fastener, double-sided tape, a stitch, a rigid fastener, or other like fastener. FIG. 10B illustrates an embodiment wherein the outer surface 402 may be flat (i.e., without pockets, holes, or apertures in which the shock absorber 400 may be contained), while the inner surface 404 may have pockets 406 which may house or otherwise the shock absorber 400 and give it space to deform or move while keeping it within a relatively defined space within the pocket 406. In addition, when recording an impact, one or more openings within the shock absorbers 400 may allow fluid to spill therefrom, contributing to the deformation and energy absorption of the shock absorbers 400. In an alternate embodiment, fluid may collect within the pockets 406, providing the fluid with a place to be spilled thereto. FIG. 10C illustrates an embodiment wherein a surrounding foam 408 of low density may be disposed between the outer surface 402 and the inner surface 404, which may hold the shock absorbers' 400 positions and orientations relatively constant thereby stabilizing the inner and outer surfaces, 402, 404, respectively, relative to one another.

Figure 11:
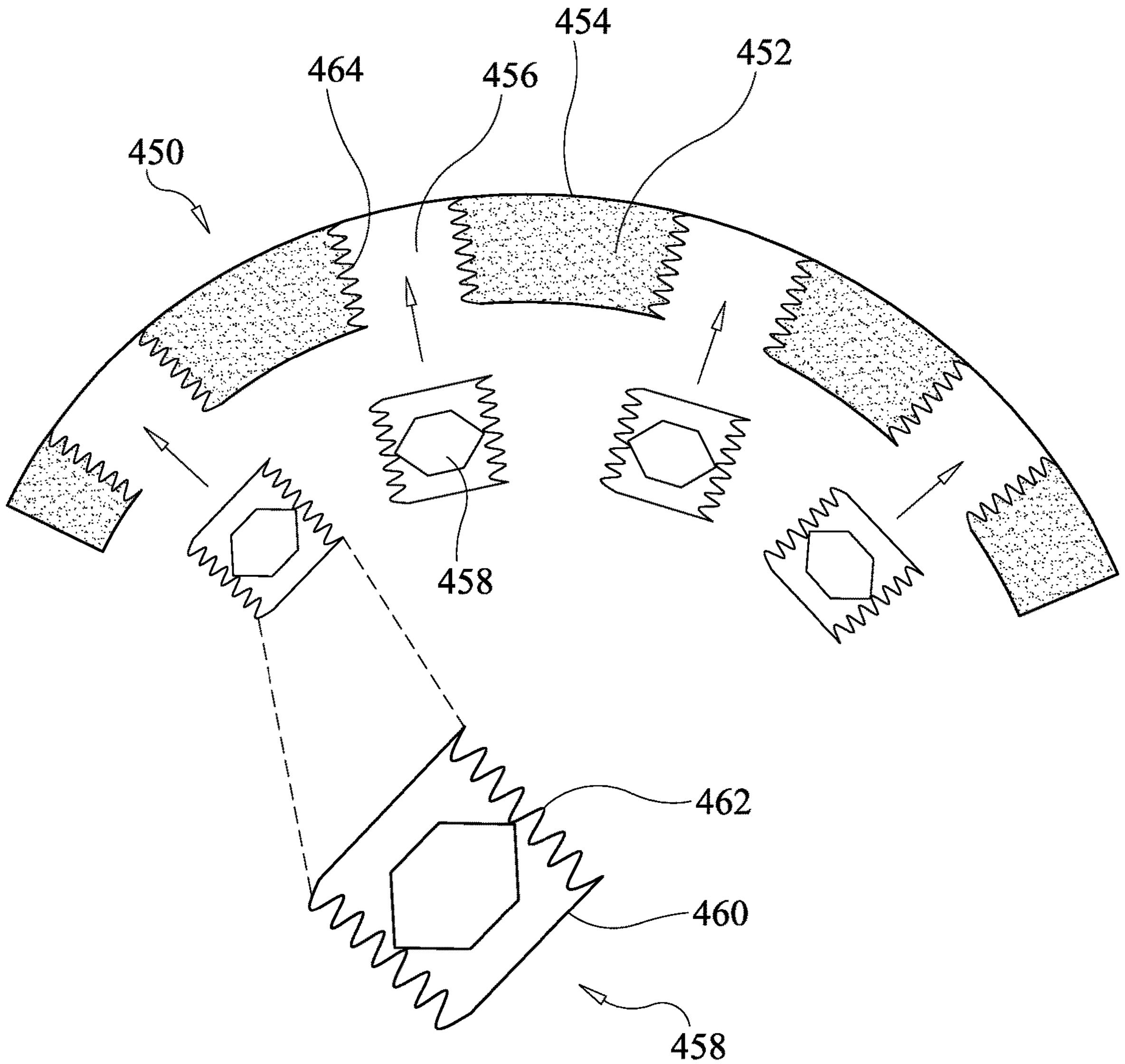
FIG. 11 illustrates a helmet that is comprised of a layer of foam attached to an outer shell, in an embodiment of the present invention.

FIG. 11 illustrates a helmet 450 that may comprise a layer 452 of foam that may be attached to an outer shell 454. The layer 452 of foam may have one or more cutouts 456 in it that may house shock absorbers 458 therein. Each of the shock absorbers 458 may have a casing or outer covering 460 that may have threaded or have ridges 462 that may be utilized to engage mating threads or ridges 464 within the layer 452 of foam, specifically at the cutouts 456 thereof, thereby allowing or aiding the shock absorbers 458 to remain in place when inserted into the cutouts 456 within the layer 452 of foam that may be affixed to the outer shell 454 of the helmet 450.

FIG. 11 further illustrates that the shock absorbers 458 may be provided without an inner layer that may be disposed between the shock absorbers and a user's head (not shown). Specifically, in an alternate embodiment of the present invention, shock absorbers of the present invention may be disposed within a protective device, as described herein, and may directly contact a user's body part, such as the user's head in a helmet, without an inner layer disposed between the shock absorbers and the user's head.

A protective device, such as a helmet, for example as described herein, typically contains an outer shell and one or more layers of shock absorbing materials used to attenuate the severity of impacts to the wearer. Shock absorbers filled entirely or partially with a fluid (e.g., a liquid, a gas, or a gel-like substance) have been found to yield highly efficient attenuation to impacts and represent the state-of-the-art in shock absorbing technologies. However, these newer shock absorbers containing fluids are often heavy relative to their predecessors. Helmets, for example, sometimes have regulations that restrict their maximum weight and users may prefer to wear a lighter helmet. If implemented into a helmet in such a manner that they directly replace their predecessor shock absorbers, these new fluid-containing shock absorbers will likely increase the overall weight of the helmet.

Therefore, in order to reduce the weight of a helmet while utilizing these newer, heavier technologies, the present invention uses fewer shock absorbers total in the helmet. Utilizing a more efficient, fluid-containing shock absorber in place of a helmet's existing shock absorbing material may yield improved impact force attenuation even in cases where the shock absorber occupies substantially less volume in the helmet than the original shock absorbing material in an effort to match the helmet's original weight, as illustrated in FIG. 6, for example.

When using fewer shock absorbers, their placement and arrangement becomes especially critical. This is because each shock absorber is now responsible for protecting a greater surface area on the head. The shock absorbers may also preferably be arranged and oriented such that they provide a sufficient fit and comfort for the wearer. This may be difficult for a small group of small shock absorbers, therefore if the shock absorbers are disposed between the outer shell and another surface closer to the wearer's head, the pressure from this shock absorber can be distributed across a larger area, thus providing improved fit, comfort, and protection. Embodiments of such a helmet could include a single shock absorber disposed between the outer shell of the helmet and an inner surface within the helmet (as illustrated in FIGS. 5A, 5B, 5C) or a plurality of shock absorbers between the outer shell and one or more inner surfaces of the helmet (as illustrated in FIGS. 1, 2, 3, and 4).

Moreover, the shock absorbers of the present invention, as described herein, preferably having a fluid disposed therein may have pathways or gaps to allow fluid to flow from within the shock absorbers to outside the shock absorbers, thereby allowing further compression of the shock absorbers and absorption of energy thereby. Thus, the pathways or gaps may lead to open spaces contained between the inner and outer layers, within one or both of the inner or outer layers, or between adjacent shock absorbers. Preferably, the pathways or gaps may allow fluid that flows therethrough to flow back into the shock absorbers, thereby resetting the same after an impact. Alternatively, the shock absorbers may be utilized once such that when fluid flows therefrom through the pathways and/or gaps, the fluid may remain external to the shock absorbers, requiring replacement thereof.

In a preferred embodiment, the inner and outer surfaces are substantially larger than the faces of the shock absorbers they make contact with (as illustrated in FIG. 10A). In another embodiment, there may be a continuous material that contains the shock absorbers within it that is disposed between the surfaces. In another embodiment, the inner surface may be made from a material that is equal in thickness or substantially thicker than the outer surface and may have holes, pockets, or depressions in it that house the shock absorbers (as illustrated in FIG. 10B). The section of material at the bottom of the holes or depressions may be designed such that it breaks at a predetermined force. This breakage may function as a signal to the wearer that it is time to replace their helmet or other protective device. In some embodiments, the inner surface may directly contact the wearer's head (as illustrated in FIGS. 1, 2, and 3) and in other cases the inner surface may contact another group of shock absorbers or another material (as illustrated in FIG. 4). The inner surface can range in thickness and material composition and may be made from a material that itself has shock absorbing capabilities. The inner surface may be a single, continuous surface that mimics the shape of the outer shell or wearer's head (as shown in FIGS. 3 and 4), or the inner surface may consist of a plurality of surfaces that together fit to the head (as shown in FIGS. 1 and 2). The shock absorbers disposed between these two surfaces may be connected to one another (as shown in FIG. 3) or stand independently (as shown in FIG. 1).

The shock absorbers disposed between the two surfaces should be able to compress sufficiently, such that when compressed, the two surfaces will move closer to one another. The shock absorbers should also shear, such that when shearing the two surfaces move opposite laterally to one another. If the shock absorbers twist, the two surfaces should rotate opposite one another as well.

The inner surface and outer surface on either side of the shock absorber(s) may be connected to one another in a variety of ways. In one embodiment, they may be connected to each other solely by their attachments to the shock absorber(s) between them (as illustrated in FIG. 1). In another embodiment, springs may attach the outer and inner surfaces. In another embodiment, they may be additionally connected with strings, cables, rubber bands, or other tensile or elastic elements (as shown in FIG. 7). These strings, cables, rubber bands, or other tensile or elastic elements may additionally serve to pre-pressurize the fluid-filled shock absorbers to a desired internal pressure. In another embodiment, they may be connected rigidly, either around the perimeter or nearer to the center of the surface(s). In another embodiment, a portion of the inner surface may be connected rigidly to the outer surface, such as with an adhesive, Velcro, a double-sided tape, a stitch, or a fastener, while a portion may be connected with strings, cables, rubber bands, or other tensile or elastic elements. In another embodiment, a low density foam may exist between the two surfaces and surround the shock absorber(s), thus stabilizing the positioning of the two surfaces and the positioning and orientation of the shock absorber(s) (as shown in FIG. 10C). In some embodiments, the shock absorbers may be connected to only one of the inner or outer surfaces, and not both, but may make contact with both surfaces upon compression during an impact.

The location of the inner and outer surfaces within the protective device may vary amongst embodiments. In one embodiment, the outer surface may be the surface farthest from the wearer, such as the outer shell. In another embodiment, the outer surface may not be the farthest surface from the wearer but may make contact with the surface farthest from the wearer. Similar to the outer surface, in one embodiment, the inner surface may be the surface nearest to the wearer such that it makes contact with the wearer. In another embodiment, the inner surface may not be the surface closest to the wearer but may make contact with the surface nearest the wearer, such as a secondary layer of shock absorbing material (as illustrated in FIG. 4) or a layer of comfort padding.

In embodiments where a plurality of inner surfaces exist, the inner surfaces may be connected to one another or stand independent of each other. The inner surfaces may be connected to each other by strings, cables, rubber bands, or other tensile or elastic elements or rigidly by plastics, stiff foams, or metal pieces. In one embodiment, the inner surfaces may be connected by a material intended to break at a predetermined force. For example, the inner surfaces could be made of an expanded polystyrene foam and connected to one another by thin pieces of expanded polystyrene foam intended to break upon high energy impact. This breakage of the material may function as a visible signal to the user that it is time to replace their helmet or other protective device. The plurality of surfaces and connections could be manufactured using a mold or similar piece of tooling as one uniform piece or varying thickness and geometry.

In one embodiment, one or both of the inner and outer surfaces may be made of a substantially low density foam, such that the foam surrounds the shock absorbers and holds them in place, but easily compresses when force is applied (as illustrated in FIG. 9). In this embodiment, the foam may compress a desired amount to provide optimal fit and comfort to the wearer. When impacted, this foam will quickly compress until reaching the shock absorber, thus engaging it.

It may be necessary for shock absorbers to be various shapes and sizes depending on the application and shape and size of the wearer's head. In some cases, their aspect ratio may be greater than one, such that they are wider than they are tall (as shown in FIGS. 2, 3, and 4). In other cases, their aspect ratio may be less than one, such that they are taller than they are wide (as illustrated in FIGS. 1 and 8). In other cases, the aspect ratio may be exactly one, such that the shock absorbers' height and width are equal. The aspect ratio may depend on the application and type of impacts expected and can vary among different shock absorbers in the same helmet.

A helmet may also consist of a layer of foam directly connected to the outer shell of the helmet and have slots cut out in it, such that a shock absorber can be inserted into the slots (as illustrated in FIG. 11). The shock absorber may be encased in a material, such as a foam, that has threads or ridges on the outside of it, such that it may be securely positioned inside the layer of foam during use of the helmet but can be replaced by the wearer or an individual trained in servicing the helmet.

Other means of making the total weight of the protective device lighter may include reducing the density of the shock absorbers while keeping their external dimensions the same. One method of doing this includes mixing the contained fluid with microspheres or another density-reducing agent. Another method of doing this is to make the shock absorber hollow at the center, such that it is shaped like a toroid or other hollow geometry that contains the fluid.

In addition to low equipment weight, users of protective equipment often desire a high amount of ventilation, as the settings in which they use the protective gear usually involve strenuous activity (such as sports or military combat). Monolithic foams often fill nearly the entire volume of a helmet and, therefore, do not allow much air flow. By using a small amount of discrete shock absorbing units, this may allow for the addition of more and/or larger ventilation holes in the shell of a helmet, such that air can travel through the helmet (shown in FIG. 7). Disposing the shock absorbers between the outer shell and a single inner surface or a plurality of inner surfaces, would allow for air to travel within the helmet (around the shock absorbers and between the outer shell and inner surface(s)) (as illustrated in FIG. 7).

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A helmet comprising:
an outer helmet shell;
a first inner panel;
a second inner panel circumferentially spaced apart from and moveable relative to the first inner panel;
a plurality of compressible liquid-containing shock absorbers disposed between the first inner panel and the outer helmet shell; and
a connection that couples the first inner panel to the second inner panel, the connection restricting independent movement of the first and second inner panels relative to one another, wherein the connection includes a spring or is elastic.

2. The helmet of claim 1, wherein the first inner panel is thinner than the plurality of liquid-containing shock absorbers.

3. A helmet comprising:
an outer helmet shell;
a first inner panel;
a second inner panel circumferentially spaced apart from and moveable relative to the first inner panel;
a plurality of compressible liquid-containing shock absorbers disposed between the first inner panel and the outer helmet shell; and
a connection that couples the first inner panel to the second inner panel, the connection restricting independent movement of the first and second inner panels relative to one another, wherein the connection between the first inner panel and second inner panel is rigid and configured to break at a predetermined force.

4. The helmet of claim 1, wherein another plurality of liquid-containing shock absorbers is disposed between the second inner panel and the outer helmet shell.

5. The helmet of claim 3, wherein the first inner panel is thinner than the plurality of liquid-containing shock absorbers.

6. The helmet of claim 4, wherein another plurality of liquid-containing shock absorbers is disposed between the second inner panel and the outer helmet shell.

* * * * *